US009874189B2

(12) United States Patent
Bjurefors

(10) Patent No.: US 9,874,189 B2
(45) Date of Patent: Jan. 23, 2018

(54) METHOD OF DETERMINING FUEL INJECTOR OPENING DEGREE

(71) Applicant: SCANIA CV AB, Södertälje (SE)

(72) Inventor: Daniel Bjurefors, Järna (SE)

(73) Assignee: SCANIA CV AB, Södertälje (SE)

( * ) Notice: Subject to any disclaimer, the term of this patent is extended or adjusted under 35 U.S.C. 154(b) by 145 days.

(21) Appl. No.: 14/896,260

(22) PCT Filed: Jun. 10, 2014

(86) PCT No.: PCT/SE2014/050692
§ 371 (c)(1),
(2) Date: Dec. 4, 2015

(87) PCT Pub. No.: WO2015/005844
PCT Pub. Date: Jan. 15, 2015

(65) Prior Publication Data

US 2016/0138544 A1 May 19, 2016

(30) Foreign Application Priority Data

Jul. 11, 2013 (SE) ...................................... 1350867

(51) Int. Cl.
*G01M 15/00* (2006.01)
*F02M 65/00* (2006.01)
(Continued)

(52) U.S. Cl.
CPC ......... *F02M 65/001* (2013.01); *F02D 41/221* (2013.01); *F02D 41/2467* (2013.01);
(Continued)

(58) Field of Classification Search
CPC .... F02M 65/00; F02M 65/001; F02M 65/002; F02M 65/003; F02M 65/005;
(Continued)

(56) References Cited

U.S. PATENT DOCUMENTS 4,383,515 A * 5/1983 Higashiyama ...... F02D 41/0087 123/478
4,453,403 A * 6/1984 Bussey ..................... G01F 3/04 73/114.45

(Continued)

FOREIGN PATENT DOCUMENTS

| | | | |
|---|---|---|---|
| DE | 102005028137 | A1 | 12/2006 |
| EP | 0860600 | A2 | 8/1998 |
| WO | 2004079176 | A1 | 9/2004 |

OTHER PUBLICATIONS

International Search Report for PCT/SE2014/050692 dated Oct. 10, 2014.

(Continued)

*Primary Examiner* — Benjamin Schmitt
(74) *Attorney, Agent, or Firm* — Moore & Van Allen PLLC; W. Kevin Ransom

(57) ABSTRACT

A method is disclosed to determine the opening degree of injectors in cylinders of a combustion engine, where the combustion engine has at least three cylinders. The injectors are connected to a fuel accumulator in a common rail fuel injection system; the fuel supply to the fuel accumulator is interrupted; and subsequently a test injection of fuel is carried out into at least two and, at most, all but for one cylinder at a time, in different combinations, at such a time that the injection does not cause any combustion in the cylinders. The pressure decreases caused in connection with the different test injections are measured, and the pressure decrease that is attributable to at least one specific injector is calculated based thereupon, which is, in turn, used in the determination of the injector's opening degree.

13 Claims, 3 Drawing Sheets

(51) Int. Cl.

| | |
|---|---|
| ***F02D 41/24*** | (2006.01) |
| ***F02D 41/38*** | (2006.01) |
| ***F02D 41/22*** | (2006.01) |
| ***F02D 41/26*** | (2006.01) |
| ***F02M 63/02*** | (2006.01) |
| *F02D 41/00* | (2006.01) |
| *F02D 41/04* | (2006.01) |

(52) U.S. Cl.
CPC ....... *F02D 41/263* (2013.01); *F02D 41/3809* (2013.01); *F02D 41/3845* (2013.01); *F02M 63/0225* (2013.01); *F02M 65/003* (2013.01); *F02D 41/0087* (2013.01); *F02D 41/042* (2013.01); *F02D 2041/224* (2013.01); *F02D 2041/389* (2013.01); *F02D 2200/0602* (2013.01); *F02D 2200/0616* (2013.01)

(58) Field of Classification Search
CPC ............ F02M 63/0225; F02D 41/2467; F02D 41/3809; F02D 41/3845; F02D 41/0087; F02D 2041/224; F02D 2200/0614; F02D 2200/0616
USPC ............................. 73/114.38, 114.45, 114.51
See application file for complete search history.

(56) References Cited

U.S. PATENT DOCUMENTS

| | | | | |
|---|---|---|---|---|
| 2009/0177366 | A1 | 7/2009 | Achleitner et al. | |
| 2010/0088006 | A1 | 4/2010 | Ito et al. | |
| 2010/0251809 | A1 * | 10/2010 | Migueis .................. | F02D 41/22 73/114.51 |
| 2012/0118053 | A1 | 5/2012 | Serra et al. | |
| 2012/0123703 | A1 | 5/2012 | Serra et al. | |
| 2012/0150417 | A1 | 6/2012 | Massaro | |

OTHER PUBLICATIONS

European Search Report from the European Patent Office for PCT/SE2014/050692 dated Feb. 17, 2017.

* cited by examiner

METHOD OF DETERMINING FUEL INJECTOR OPENING DEGREE

CROSS-REFERENCE TO RELATED APPLICATIONS

This application claims is a national stage application (filed under 35 U.S.C. 371) of PCT/SE2014/050692, filed Jun. 10, 2014 of the same title, which, in turn, claims priority to Swedish Application No. 1350867-6, filed Jul. 11, 2013 of the same title; the contents of each of which are hereby incorporated by reference.

TECHNICAL FIELD OF THE INVENTION

The present invention pertains to a method for determining the opening degree of injectors in cylinders in a combustion engine with at least three cylinders, wherein said injectors are connected to a fuel accumulator in a common rail fuel injection system, and wherein the method is started when the fuel accumulator is pressurized, and a combustion engine employing the method.

BACKGROUND

The injectors in a said combustion engine are controlled with the help of an engine control device, which controls the opening times for each individual injector in order thus to control the amount of fuel to be injected into the cylinder belonging to the injector. Here, apart from the duration of the opening time, the prevailing fuel pressure in the fuel accumulator and the injector's opening degree determine how large a fuel amount is injected into the cylinder. In order to keep emissions of contaminants, re-suiting from the combustion in the respective cylinder, at a minimal level, it is important to know exactly how large an amount of fuel is injected into the cylinder, so that the desired mixture of air and fuel to achieve said minimal emission level may be achieved. The fuel pressure in the fuel accumulator and the opening time of the respective injector are easy to determine, but the injector's features and, consequently, its opening degree, may change over time. This fact is not critical as long as the opening degree may be determined with precision, since e.g. a reduced opening degree may be compensated by an extended opening time of the injector. Opening degree as used herein therefore means how much the injector is open when it is opened, i.e. it is a measure that determines how much fuel leaves the injector per time unit at a given fuel pressure in the fuel accumulator when the injector is open. If one wishes to inject a certain amount of fuel, the opening degree at a certain fuel pressure is thus decisive for the duration of the injection period, which is sometimes called the injector's injection duration. Over time, the valve of the injector may be increasingly clogged, so that the opening time must be extended in order for a certain fuel amount to be injected. However, parts of the injector's valve may also age or be compressed over time, so that more fuel is injected per time unit than expected, i.e. the injector's opening degree increases with time. In this case, the injector's opening time for a given fuel amount should be shortened. This way of controlling the opening time may be called fuel amount adaptation. However, from an emission point of view, it is most important to know the exact opening degree of the respective injector at a given point in time, in order to know the exact fuel amount injected into the cylinder.

US 201210150417 A1 describes a method of the type defined above, which tests whether an injector of the combustion engine is totally or partly clogged by carrying out a test injection of fuel into the associated cylinder, while simultaneously a change of the fuel pressure in the fuel accumulator during the test injection is measured in order to thus obtain a measure of the injector's opening degree.

SUMMARY OF THE INVENTION

The pressure fall or pressure decrease which may be used to calculate the injected fuel amount, and thus the opening degree of an injector, is dependent on the total pressurized volume in which the fuel accumulator is comprised. Accordingly, such a greater volume results in a smaller pressure fall, which may then come close to the noise level of the fuel pressure in the fuel injection system. This means that a method according to said US document is unable, in some situations, to deliver an opening degree value in an injector with sufficiently high precision in order to ensure that the emission levels are maintained at a desired low level.

The objective of the present invention is to provide a method which is improved with respect to the ability to reliably determine the opening degree of injectors in combustion engines.

The invention is not limited to any certain type of combustion engine or fuel, and diesel and ethanol may be mentioned as a couple of non-exhaustive examples of fuel. The invention also pertains to the determination of the opening degree of injectors in cylinders of combustion engines designed for all types of use, such as in industrial applications, crushing machines and in various types of motor vehicles, even though the invention is particularly applicable to wheeled motor vehicles, especially commercial vehicles, such as trucks and buses, and will for this reason sometimes be discussed in this use for purposes of elucidating, but not limiting, the invention.

This objective is achieved, according to the invention, by providing such a method with the features listed in the characterising portion of claim 1.

By carrying out a test injection of fuel into several cylinders simultaneously, a larger pressure fall at an authorized distance from the noise level of the determined pressure in the system may be achieved, and by then repeating the test injection for divergent combinations of injectors/cylinders, the pressure fall attributable to a specific injector and thus such injector's opening degree may be determined with good precision. This makes possible, in the longer term, an adaptation of the opening times of the injector in question to a determined opening degree, and at the same time ensures minimal emissions of contaminants during the combustion engine's operation.

According to one embodiment of the invention, the repetition according to step d) is carried out for as many divergent combinations of injectors that the pressure reduction attributable to each specific injector of the combustion engine may be calculated in step e), in step d) each such pressure reduction is calculated and step f) is completed for the determination of the opening degree of all injectors in the combustion engine. In order to ensure that the level of emissions during the operation of the engine is main-tamed at a minimal level, it is naturally desirable to determine the opening degree of all injectors, which would be possible with certain interruptions during the performance of the method. This may in particular be the case if the combustion engine is arranged in a vehicle, since said test injections may then be suitable to perform during a special operation of the vehicle, such as when driving on downhill slopes or in vehicles at a standstill.

According to another embodiment of the invention, steps b), c) and d) are carried out when the combustion engine is turned off. This ensures, in a reliable manner, that the test injection is carried out at such point in time where the injection does not cause any combustion in the cylinders, and at the application of the combustion engine in a motor vehicle it may advantageously occur when the vehicle is driven on a downhill slope, when the combustion engine is automatically turned off by an engine control device. Hence, after the completion of step a), the combustion engine is advantageously turned off and kept turned off during the performance of steps b), c) and d).

According to another embodiment of the invention, after each test injection in step b), fuel is supplied to the fuel accumulator and subsequently step a) is performed, so that the relevant fuel pressure in the fuel accumulator is the same at each start and test injection during step b). By having the same starting fuel pressure in the fuel accumulator at each test injection, with different combinations of injectors, the calculation of pressure reductions attributable to specific injectors is made easier, and the accuracy of the determination of the respective injector's opening degree is increased.

According to another embodiment of the invention, the method is carried out automatically with predetermined time intervals, defined by a specific operating time of the combustion engine, a determined number of operations/drivings of the combustion engine or a certain lapsed time. Such automatic recurring of the determination of the opening degree of specific injectors ensures that the combustion engine may constantly be driven in a manner which is optimal in this regard, from an emission point of view.

According to another embodiment of the invention, the method is carried out for a combustion engine with at least six cylinders, and in step b) a test injection is carried out simultaneously in at least two or at least three, or three, four or five cylinders. The more cylinders/injectors participating in a test injection, the more negligible the occurrence of noise in the determined pressure in the system becomes, while at the same time more test injections are required to determine the respective injectors opening degree. This means that more fuel is lost, since fuel is consumed at each test injection without being used to generate any power.

According to another embodiment of the invention, the method is carried out for a combustion engine with twelve cylinders, and in step b) a test injection is performed simultaneously in at least three, three-eleven, four-six, four, five or six cylinders simultaneously. Now many cylinders it is suitable to inject fuel into simultaneously may depend on the specific use of the combustion engine. It may be suitable to inject simultaneously into around four cylinders at a time in a twelve-cylinder engine.

The invention also provides a combustion engine according to the preamble, which is equipped with the features set out in the characterising portion of the enclosed independent claims for such a combustion engine. The advantages of such a combustion engine are set out in the discussion above, concerning the method according to the invention.

The invention also pertains to a computer program with the features listed in claim 10, a computer program product with the features listed in claim 11, an electronic control device with the features listed in claim 12, and a motor vehicle according to claims 13 and 14.

Other advantageous features of and advantages with the invention are set out in the description below.

BRIEF DESCRIPTION OF THE DRAWINGS

Below are descriptions of example embodiments of the invention, with reference to the enclosed drawings, in which.

DETAILED DESCRIPTION OF EMBODIMENTS ACCORDING TO THE INVENTION

Figure 1:
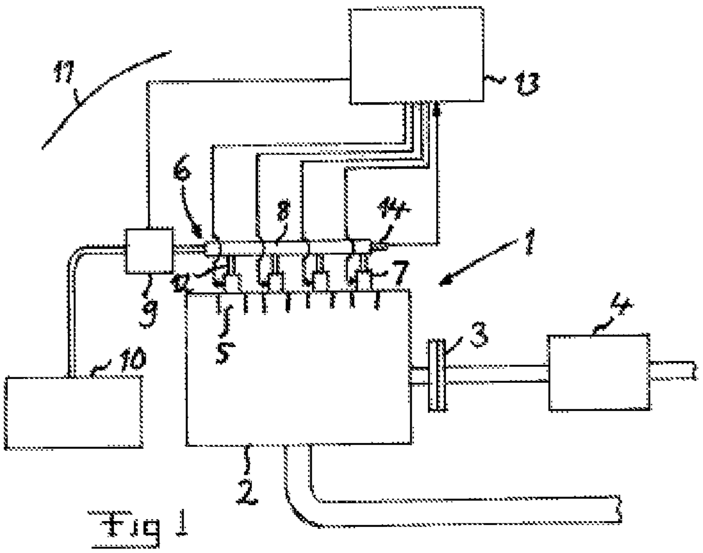
FIG. 1 is a schematic drawing of a combustion engine with a common rail fuel injection system in which a method according to the invention may be applied.

The use of a combustion engine according to the invention in a motor vehicle will now be described for purposes of exemplifying, and a driveline 1 of a motor vehicle is schematically illustrated in FIG. 1. The driveline 1 comprises a combustion engine 2, e.g. a diesel engine, which is connected to driving wheels (not displayed) of the vehicle via a clutch 3 and a gearbox 4.

The combustion engine 2 comprises several, specifically four, schematically indicated cylinders 5. It is pointed out, however, that the combustion engine may comprise any suitable number of cylinders, larger than two. Fuel is supplied to the cylinders with the help of a common rail fuel injection system 6. Such fuel injection system 6 comprises a number of electrically controlled injectors 7. Each cylinder of the combustion engine 2 is assigned its own injector 7. The injectors 7 are connected to a fuel accumulator 8 in the form of a so-called common rail, which consists of an accumulator for accumulation of high pressure fuel to be supplied to the injectors. The fuel accumulator 8 is supplied with pressurized fuel by a high pressure pump 9, which receives fuel from a fuel tank 10 of the vehicle 11. The injectors 7 are connected to the fuel accumulator 8 via fuel conduits 12, branching from the fuel accumulator, in order to inject fuel accumulated in the fuel accumulator 8 into the respective cylinders.

The invention is applicable to combustion engines with a common rail fuel injection system, where the opening times for the injectors 7 are controlled by an engine control means, e.g. in the form of an electronic control device 13. Herein, the control may take place with the help of an opening time calculation model or a look-up table based on a fuel pressure value P and a fuel injection amount value M, where said fuel pressure value P represents the fuel pressure in the fuel accumulator 8, and said fuel injection amount value M represents a desired fuel amount to be injected into a cylinder of the engine 2. A pressure sensor 14 is arranged to measure the fuel pressure in the fuel accumulator 8 and send information regarding the measured fuel pressure to the electronic control device 13.

Figure 2:
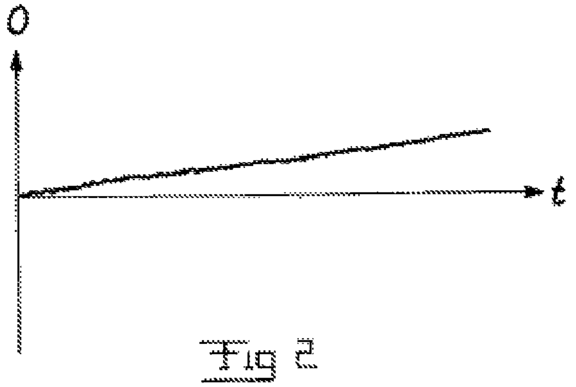
FIG. 2 is a schematic diagram illustrating a typical change over time of the opening degree in an injector in a combustion engine according to FIG. 1.

FIG. 2 schematically illustrates a possible course for the opening degree O of an injector 7 in the combustion engine 2, of the above described type, over time t. Accordingly, this shows that the opening degree increases over time. As described above, it is important at each point in time to know the respective injectors' opening degree, which does not necessarily develop over time as displayed in FIG. 2, in order to control the opening times of the injector depending thereon, and to know the exact amount of fuel that is injected into the relevant cylinder in order to keep emission levels at a minimum.

One method according to the invention, for the determination of the opening degree of the injectors 7 in the combustion engine 2 in FIG. 1, starts when the fuel accumulator 8 is pressurized, i.e. the combustion engine 2 must have been started and the high pressure pump 9 must have supplied fuel from the fuel tank 10 to the fuel accumulator 8 under a high pressure, but subsequently the engine may be turned off. The method starts by interrupting the fuel supply to the fuel accumulator 8, whereupon at least two and, in the case displayed, a maximum of three injectors 7, are controlled by the electronic control device 13 to open for a specific period of time and carry out a test injection of fuel into the associated cylinders, wherein the test injection is carried out at such point in time that the injection does not cause any combustion in such cylinders, which is easiest done if the engine is turned off, but the engine may also be in operation provided it is ensured that the test injections are carried out at a said point in time.

The pressure sensor 14 measures the pressure decrease of the fuel in the fuel accumulator 8, resulting from the test injection. Subsequently, the test injection as well as the pressure measurement are repeated for the number of divergent combinations of injectors participating in the test injection, making it possible to, in the electronic control device 13, calculate the pressure decrease attributable to at least one specific injector, preferably all the injectors. The calculated pressure decrease for the respective injectors is then compared in the electronic control device 13 with a pressure reduction, expected at a certain opening degree of the injector for the relevant fuel pressure in the fuel accumulator and a specific opening time of the injector, and based on such comparison the injector's opening degree is determined. This information may then be used to determine the opening time of the injector in order for the fuel accumulator 8 to inject a certain fuel amount into the associated cylinder at a certain fuel pressure.

In case of four cylinders, test injections may e.g. take place according to cylinder 1+cylinder 3, cylinder 1+cylinder 4, cylinder 2+cylinder 3, cylinder 1+cylinder 2, cylinder 2+cylinder 4 and cylinder 3+cylinder 4, following which the opening degree for the injectors for all four cylinders is determined.

It would also be possible to e.g. carry out a test injection into cylinder 1+cylinder 2, cylinder 1+cylinder 3 and cylinder 2+cylinder 3 in order to determine the opening degree of cylinders 1, 2 and 3, and then make a test injection in cylinder 1+cylinder 4, and to thus determine the opening degree of cylinder 4.

Another possibility would be to carry out a test injection into cylinder 1+2+3, cylinder 1+2+4, cylinder 1+3+4 and cylinder 2+3+4 in order to determine the opening degree of all injectors.

In case of e.g. a twelve-cylinder combustion engine, it might be suitable to carry out a test injection into four cylinders at a time in order to thus provide a pressure decrease, which greatly exceeds the noise level of the determined pressure in the fuel injection system. It would also be possible to carry out test injections, according to as few combinations of injectors as possible, in order for it to be possible to calculate the pressure decrease attributable to a certain injector, and subsequently to carry out test injections with two injectors at a time, one of which is the one for which the pressure decrease is calculated, in order to "throw away" as little fuel as possible for the determination of the injectors opening degree.

Figure 3:
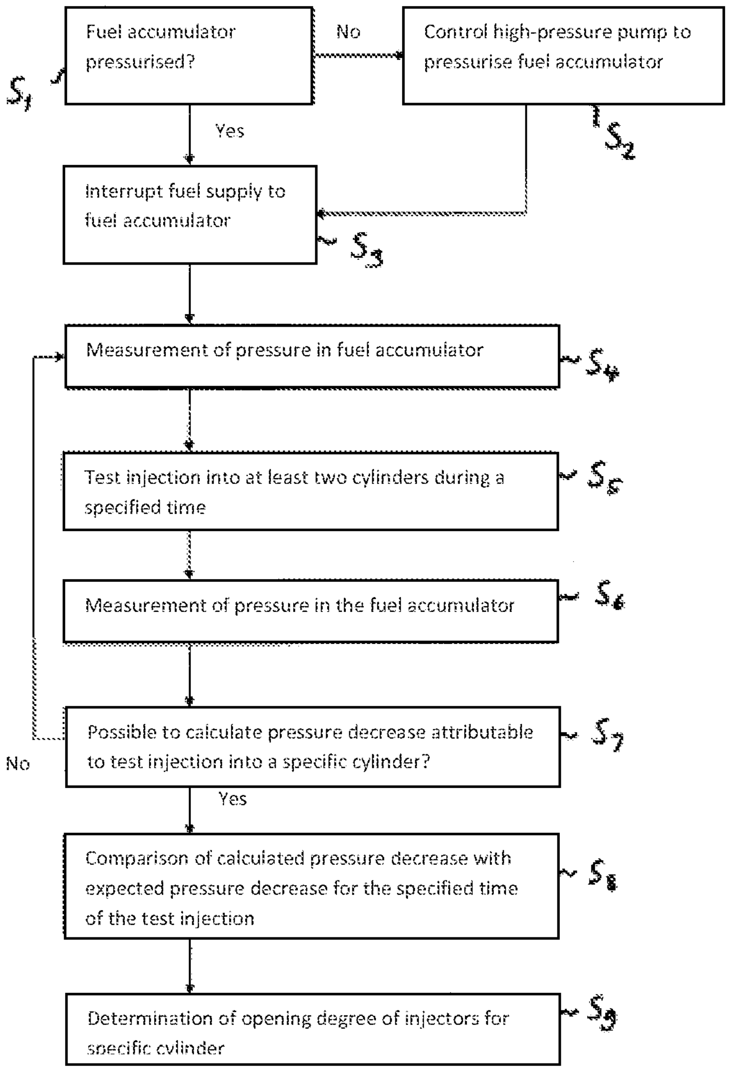
FIG. 3 is a schematic diagram of an electronic control device for the implementation of a method according to the invention.

FIG. 3 shows a flow chart illustrating a method, according to one embodiment of the invention, for the determination of the opening degree of injectors in cylinders in a combustion engine with at least three cylinders. In a first step $S_1$ it is verified whether the combustion engine's fuel accumulator is pressurized. If the answer to this question is no, the method continues to step $S_2$, in which the combustion engine's high pressure pump is controlled to pressurize the fuel accumulator. If the answer to the question is yes, the method continues with step $S_3$, in which the fuel supply to the fuel accumulator is interrupted. Subsequently, in step $S_4$ the pressure in the fuel accumulator is measured, whereupon in step $S_5$ the test injection of fuel in at least two cylinders is carried out during a specific time. Thereupon, in step $S_6$ the pressure in the fuel accumulator is measured again. Subsequently, in step $S_7$ the question is asked whether it is possible to calculate a pressure decrease attributable to test injection into a specific cylinder, and if the answer to this question is no, steps $S_4$-$S_7$ are repeated. If the answer to the question is yes, in step $S_8$ the calculated pressure decrease is compared with the expected pressure decrease for the specific time for the test injection, and in step $S_9$ the opening degree of an injector for a specific cylinder is then determined.

A computer program code for the implementation of a method according to the invention is suitably included in a computer program, loadable into the internal memory of a computer, such as the internal memory of an electronic control device of a combustion engine. Such a computer program is suitably provided via a computer program product comprising a data storage medium readable by an electronic control device, the data storage medium of which has the computer program stored thereon. Said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 4:
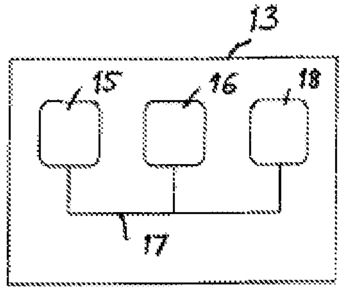
FIG. 4 is a flow chart illustrating a method according to one embodiment of the invention.

FIG. 4 illustrates very schematically an electronic control device 13 comprising an execution means 15, such as a central processor unit (CPU), for the execution of a computer software. The execution means 15 communicates with a memory 16, e.g. a RAM memory, via a data bus 17. The control device 13 also comprises a data storage medium 18, e.g. in the form of a Flash memory or a ROM, PROM, EPROM or EEPROM type memory. The execution means 15 communicates with the data storage means 18 via the data bus 17. A computer program comprising computer program code for the implementation of a method according to the invention, e.g. in accordance with the embodiment illustrated in FIG. 3, is stored in the data storage medium 18.

The invention is obviously not limited in any way to the embodiments described above, but numerous possible modifications thereof should be obvious to a person skilled in the area, without such person departing from the spirit of the invention as defined by the appended claims.

The invention claimed is:

1. A method to determine the opening degree of injectors in cylinders in a combustion engine with at least three cylinders, wherein said injectors are connected to a fuel accumulator in a common rail fuel injection system and wherein the method starts when the fuel accumulator is pressurized, wherein the method comprises:

a) interrupting the fuel supply to the fuel accumulator;

b) controlling at least two, and at most all except one of the injectors, to simultaneously open at a specified time and to carry out a test injection of fuel into the associated cylinders, wherein the test injection is carried out at such a point in time that the injection does not cause any combustion in such cylinders;

c) measuring the pressure decrease in the fuel in the fuel accumulator resulting from the test injection;

d) repeating operations b) and c) for a number of divergent combinations of injectors participating in the test injection, so that a subsequent operation e) may be carried out;

e) calculating, based on measured pressure decreases during the test injections, the pressure decrease which is attributable to at least one specific injector; and f) comparing the pressure decrease calculated for said at least one injector with a pressure decrease expected, at a certain opening degree of the injector for the given fuel pressure in the fuel accumulator and a certain opening time of the injector, and based on this comparison to determine an injector's opening degree.

2. The method according to claim 1, wherein the repetition according to operation d) is carried out for the number of divergent combinations of injectors, so that the pressure decrease in operation e), attributable to each specific injector of the combustion engine, may be calculated, and in that each such pressure decrease is calculated in operation e) and in that operation f) is carried out for the determination of the opening degree of all injectors of the combustion engine.

3. The method according to claim 1, wherein operations b), c) and d) are carried out with the combustion engine turned off.

4. The method according to claim 3, wherein, after the completion of operation a), the combustion engine is turned off and continues to be turned off during the performance of operation b), c) and d).

5. The method according to claim 1, wherein, upon each test injection in operation b), fuel is supplied to the fuel accumulator, and subsequently operation a) is carried out, so that the current fuel pressure in the fuel accumulator is the same at each start of a test injection in operation b).

6. The method according to claim 1, wherein it is carried out automatically with predetermined intervals, defined by a specified operating time of the combustion engine, a specified number of operations/drivings of the combustion engine or a certain lapsed time.

7. The method according to claim 1, wherein the method is performed for a combustion engine with at least six cylinders, and that in operation b) a test injection i carried out simultaneously into:

at least two cylinders;
at least three cylinders;
at least four cylinders; or
at least and five cylinders.

8. The method according to claim 1, wherein it is carried out for a combustion engine with twelve cylinders, and that in operation b) a test injection is carried out simultaneously into:

at least three cylinders;
three to eleven cylinders;
four to six cylinders;
four cylinders;
five cylinders; or
six cylinders simultaneously.

9. A combustion engine comprising at least three cylinders, one common rail fuel injection system with injectors for injection of fuel into the cylinders, the injectors being connected to a fuel accumulator of the common rail fuel injection system, and a means designed to measure the fuel pressure in the fuel accumulator, wherein the combustion engine further o comprises an electronic control device configured to: control at least two, and at most all except one of the injectors, to simultaneously open at a specified time and to carry out a test injection of fuel into the associated cylinders, wherein the test injection is carried out at such a point in time that the injection does not cause any combustion in such cylinders;

determine the pressure decrease in the fuel in the fuel accumulator, resulting from the test injection;

repeat the test injection and the determination of the pressure decrease for a number of divergent combinations of injectors participating in the test injection;

calculate, based on the determined pressure decrease during the test injections, the pressure decrease which is attributable to at least one specific injector; and compare the pressure decrease calculated for said at least one injector with a pressure decrease expected at a certain opening degree of the injector for the given fuel pressure in the fuel accumulator and a certain opening time of the injector, and based on this comparison to determine an injector's opening degree.

10. A computer program product located on a non-transitory medium, which is readable by one or more computing devices, wherein the computer program code is used to determine the opening degree of injectors in cylinders in a combustion engine with at least three cylinders, wherein said injectors are connected to a fuel accumulator in a common rail fuel injection system and wherein the determination starts when the fuel accumulator is pressurized, wherein the computer program product comprises instructions for operation by one or more computing devices to cause said one or more computing devices to:

a) interrupt the fuel supply to the fuel accumulator;

b) control at least two, and at most all except one of the injectors, to simultaneously open at a specified time and to carry out a test injection of fuel into the associated cylinders, wherein the test injection is carried out at such a point in time that the injection does not cause any combustion in such cylinders;

c) measure the pressure decrease in the fuel in the fuel accumulator resulting from the test injection;

d) repeat operations b) and c) for a number of divergent combinations of injectors participating in the test injection, so that a subsequent operation e) may be carried out;

e) calculate, based on measured pressure decreases during the test injections, the pressure decrease which is attributable to at least one specific injector; and f) compare the pressure decrease calculated for said at least one injector with a pressure decrease expected, at a certain opening degree of the injector for the given fuel pressure in the fuel accumulator and a certain opening time of the injector, and based on this comparison to determine an injector's opening degree.

11. An electronic control device for a combustion engine, comprising;

an execution means; a memory connected to the execution means and a non-transitory data storage medium connected to the execution means; and computer program code stored on said data storage medium, wherein the computer program code is used to determine the opening degree of injectors in cylinders in a combustion engine with at least three cylinders, wherein said injectors are connected to a fuel accumulator in a common rail fuel injection system and wherein the determination starts when the fuel accumulator is pressurized, wherein the computer program product comprises instructions for operation by the execution means to cause said execution means to:

a) interrupt the fuel supply to the fuel accumulator;

b) control at least two, and at most all except one of the injectors, to simultaneously open at a specified time and to carry out a test injection of fuel into the associated cylinders, wherein the test injection is carried out at such a point in time that the injection does not cause any combustion in such cylinders;

c) measure the pressure decrease in the fuel in the fuel accumulator resulting from the test injection;

d) repeat operations b) and c) for a number of divergent combinations of injectors participating in the test injection, so that a subsequent operation e) may be carried out;

e) calculate, based on measured pressure decreases during the test injections, the pressure decrease which is attributable to at least one specific injector; and f) compare the pressure decrease calculated for said at least one injector with a pressure decrease expected, at a certain opening degree of the injector for the given fuel pressure in the fuel accumulator and a certain opening time of the injector, and based on this comparison to determine an injector's opening degree.

12. A motor vehicle comprising a combustion engine comprising at least three cylinders, one common rail fuel injection system with injectors for injection of fuel into the cylinders, the injectors being connected to a fuel accumulator of the common rail fuel injection system, and a means designed to measure the fuel pressure in the fuel accumulator, wherein the combustion engine further comprises an electronic control device configured to:

control at least two, and at most all except one of the injectors, to simultaneously open at a specified time and to carry out a test injection of fuel into the associated cylinders, wherein the test injection is carried out at such a point in time that the injection does not cause any combustion in such cylinders;

determine the pressure decrease in the fuel in the fuel accumulator, resulting from the test injection;

repeat the test injection and the determination of the pressure decrease for a number of divergent combinations of injectors participating in the test injection;

calculate, based on the determined pressure decrease during the test injections, the pressure decrease which is attributable to at least one specific injector; and compare the pressure decrease calculated for said at least one injector with a pressure decrease expected at a certain opening degree of the injector for the given fuel pressure in the fuel accumulator and a certain opening time of the injector, and based on this comparison to determine an injector's opening degree.

13. The motor vehicle according to claim 12, wherein the motor vehicle is a wheeled motor vehicle.

* * * * *